United States Patent
Kawamura et al.

(10) Patent No.: US 8,529,806 B2
(45) Date of Patent: Sep. 10, 2013

(54) PROCESS FOR PRODUCING REGENERATED ELASTIC ROLLER

(75) Inventors: Kunimasa Kawamura, Mishima (JP); Takashi Kusaba, Suntou-gun (JP); Shohei Urushihara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/334,731

(22) Filed: Dec. 22, 2011

(65) Prior Publication Data

US 2012/0091608 A1    Apr. 19, 2012

Related U.S. Application Data

(63) Continuation of application No. PCT/JP2011/005403, filed on Sep. 27, 2011.

(30) Foreign Application Priority Data

Sep. 30, 2010 (JP) .................................. 2010-221421

(51) Int. Cl.
*B29C 73/00* (2006.01)
*G03G 15/08* (2006.01)

(52) U.S. Cl.
USPC ........ 264/36.12; 264/36.1; 264/322; 399/279

(58) Field of Classification Search
USPC ...................................................... 264/36.12
See application file for complete search history.

(56) References Cited

U.S. PATENT DOCUMENTS

| | | | |
|---|---|---|---|
| 5,160,671 A * | 11/1992 | Satoh ........................ | 264/36.16 |
| 6,586,149 B2 | 7/2003 | Kawamura et al. | |
| 6,600,893 B2 | 7/2003 | Ashibe et al. | |
| 6,636,715 B2 | 10/2003 | Kawamura et al. | |
| 6,725,002 B2 | 4/2004 | Sakurai et al. | |
| 6,737,133 B2 | 5/2004 | Kusaba et al. | |
| 6,853,820 B2 * | 2/2005 | Saito et al. ................. | 399/109 |
| 7,060,406 B2 | 6/2006 | Kawamura et al. | |
| 7,208,211 B2 | 4/2007 | Tanaka et al. | |
| 7,798,948 B2 | 9/2010 | Kawamura et al. | |

(Continued)

FOREIGN PATENT DOCUMENTS

| | | |
|---|---|---|
| JP | 2004-109688 A | 4/2004 |
| JP | 2007-4044 A | 1/2007 |
| JP | 2008-197641 A | 8/2008 |
| JP | 2010-181002 A | 8/2010 |

OTHER PUBLICATIONS

International Search Report dated Oct. 25, 2011 in International Application No. PCT/JP2011/005403.
PCT International Search Report and Written Opinion of the International Searching Authority, International Application No. PCT/JP2011/005403, Mailing Date Oct. 25, 2011.
Yamada, et al., U.S. Appl. No. 13/438,580, filed Apr. 3, 2012.

(Continued)

*Primary Examiner* — Benjamin Schiffman
(74) *Attorney, Agent, or Firm* — Fitzpatrick, Cella, Harper & Scinto (57) ABSTRACT

There is provided a process for producing a regenerated elastic roller which can be again used for the formation of high-quality electrophotographic images by sufficiently relaxing a compression set of the elastic roller having the compression set caused in an elastic layer in usage. The process for producing a regenerated elastic roller includes a step of heating an elastic roller having a conductive mandrel and an elastic layer and having a compression set caused in the elastic layer, in a cylindrical mold to thermally expand the elastic layer and to cause a surface of the elastic roller to contact an inner wall of the cylindrical mold.

4 Claims, 1 Drawing Sheet

(56) References Cited

U.S. PATENT DOCUMENTS

| | | |
|---|---|---|
| 7,979,004 B2 | 7/2011 | Tanaka et al. |
| 2008/0286016 A1 | 11/2008 | Kawamura et al. |
| 2009/0290907 A1 | 11/2009 | Kawamura et al. |

OTHER PUBLICATIONS

English translation of International Preliminary Report on Patentability, International Application No. PCT/JP2011/005403, Mailing Date Apr. 18, 2013.

* cited by examiner

FIG. 3

PROCESS FOR PRODUCING REGENERATED ELASTIC ROLLER

CROSS-REFERENCE TO RELATED APPLICATIONS

This application is a continuation of International Application No. PCT/JP2011/005403, filed Sep. 27, 2011, which claims the benefit of Japanese Patent Application No. 2010-221421, filed Sep. 30, 2010.

BACKGROUND OF THE INVENTION

1. Field of the Invention

The present invention relates to a process for producing a regenerated elastic roller used in an electrophotographic image forming apparatus.

2. Description of the Related Art

In electrophotographic image forming apparatuses, elastic rollers in which an elastic layer including rubber and the like is formed on the periphery of a conductive core metal are used as developing rollers and charging rollers. Such elastic rollers are often placed in a state of abutting other members in electrophotographic image forming apparatuses. Therefore, due to long-term usage thereof, a considerably unrecoverable deformation, a so-called compression set is sometimes caused in elastic layers of elastic rollers. The deformed portions of such elastic rollers sometimes exert an influence on development and charging, and in its turn an influence even on the quality of electrophotographic images.

In recent years, from the viewpoint of reducing the environmental load, for reutilizing elastic rollers having such compression set caused, the development of a technology has been demanded which recycles the elastic rollers so as to allow the elastic rollers to be used for formation of high-quality electrophotographic images by relaxing the compression set of elastic layers. Then, Japanese Patent Application Laid-Open No. 2008-197641 discloses a process for producing a regenerated elastic roller, which includes a step of relaxing the compression set of an elastic roller by heating the roller surface.

SUMMARY OF THE INVENTION

However, studies by the present inventors have revealed that there are some cases where the method according to Japanese Patent Application Laid-Open No. 2008-197641 shown above cannot sufficiently relax the compression set of an elastic roller.

Then, the present invention is directed to provide a process for producing a regenerated elastic roller which can be again used for formation of high-quality electrophotographic images by sufficiently relaxing a compression set of the elastic roller whose elastic layer has the compression set caused in usage.

According to one aspect of the present invention, there is provided a process for producing a regenerated elastic roller comprising the steps of: heating in a cylindrical mold an elastic roller comprising an electrically conductive mandrel and an elastic layer to which a compression set has been occurred, and thermally expanding said elastic layer so that the surface of said elastic roller comes into contact with an inner surface of said cylindrical mold.

According to the present invention, it can provide a regenerated elastic roller which enables an electrophotographic image forming apparatus to produce high-quality electrophotographic images.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors have found as described above that a compression set can be relaxed by heating an elastic roller having the compression set caused in an elastic layer, in a cylindrical mold to thermally expand the elastic layer and to cause a surface of the elastic roller to contact an inner wall of the cylindrical mold, and this finding has led to the present invention.

The present inventors presume the reason that the present invention can relax the compression set, as follows. That is, the present inventors presume that the compression set is caused in an elastic layer including rubber by the following two phenomena.

First, the reason that an elastic layer exhibits viscoelastic properties is due to that a polymer constituting the elastic layer is a macromolecular assembly. It is known that if a force is exerted to a polymer, the interatomic distance, the bond angle and the like in the molecules of the polymer deform to thereby cause strains in the polymer. Therefore, when a force causing such phenomena is exerted to a polymer continuously over a long period, the polymer molecules entangle, resulting in the polymer hardly elastically deforming. When a force is exerted to a part of an elastic layer including rubber continuously over a long period, the above-mentioned phenomena occur on the part, conceivably causing a compression set. Second, it is known that low-molecular components are present in a rubber. Therefore, when a force is continuously exerted to a part of an elastic layer, the low-molecular components conceivably move to portions whose pressure is relatively low. That is, it is conceivable that the low-molecular components are in a state of being squeezed out to the periphery of pressurized portions, and unevenly distributed in non-pressure portions and relatively low-pressure portions. Then as a result that the state is maintained even after the pressure is released, it is difficult for the deformation of the pressure portions to recover, which is conceivably one cause of the compression set. In the case where an elastic roller having an elastic layer having compression sets caused by these phenomena is heated in a cylindrical mold, the molecular motion is first activated and the entanglement of the polymer chain comes to be disentangled.

In a process in which a surface of an elastic roller is caused to contact a mold inner wall by thermally expand an elastic layer by heating the elastic roller in a cylindrical mold, while sites where no compression set occurs contact with the inner wall, a state occurs in which sites where the compression set occurs does not yet contact the mold inner wall. That is, a state occurs in which a pressure is exerted from the inner wall to a non-deformed portion of the elastic layer, while no pressure is exerted from the mold inner wall to a deformed portion of the elastic layer. That is, this means that a relative pressure difference inverse to the state in which the compression set occurs is generated in the deformed portion and the non-deformed portion. Thereby, the low-molecular components unevenly distributed in the non-deformed portion move from the non-deformed portion toward the deformed portion according to the above-mentioned relative pressure difference (pressure gradient) to thus relax the uneven distribution of the low-molecular components of the rubber. It is conceivable that the compression set is consequently relaxed.

Elastic Roller

Figure 1A:
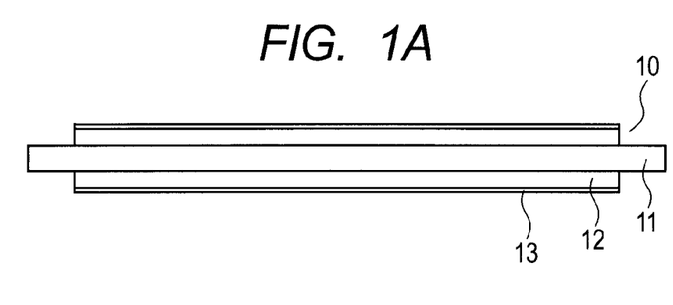
FIG. 1A is a schematic sectional diagram illustrating an example of the roller for electrophotography according to the present invention.
Figure 1B:
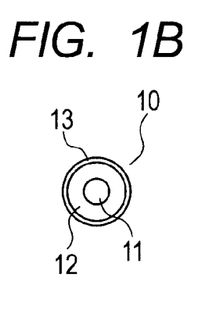
FIG. 1B is a schematic sectional diagram illustrating an example of the roller for electrophotography according to the present invention.

An elastic roller to become an object to be regenerated in the process for producing a regenerated elastic roller according to the present invention is various types of elastic rollers used in image forming apparatuses utilizing electrophotographic processes. The elastic rollers specifically include developing rollers, charging rollers, transferring rollers, fixing rollers and cleaning rollers. Such an elastic roller has, as illustrated in FIG. 1A and FIG. 1B, a conductive mandrel 11, an elastic layer 12 formed on the periphery of the mandrel 11, and a surface layer 13.

(Mandrel)

As the mandrel 11, ones including a carbon steel, an alloy steel, a cast iron or a conductive resin can be used.

(Elastic Layer)

The elastic layer 12 may be either of a solid body and a foaming body. The elastic layer includes a rubber. Specific examples of the rubber material include natural rubber, isoprene rubber, styrene rubber, butyl rubber, butadiene rubber, fluororubber, urethane rubber and silicone rubber. These rubber materials may be used singly or in combination of two or more. A filler may be added to the elastic layer 12 in the range of not inhibiting properties of the low hardness and the low compression set.

A conductive agent to be contained in the elastic layer 12 in order to regulate the electric resistance of the elastic layer 12 includes ion conductive agents and electron conductive agents.

The ion conductive agents include as salts of group I metals of the periodic table, $LiCF_3SO_3$, $NaClO_4$, $LiClO_4$, $LiAsF_6$, $LiBF_4$, NaSCN, KSCN and NaCl; as ammonium salts, $NH_4Cl$, $(NH_4)_2SO_4$ and $NH_4NO_3$; as salts of group II metals of the periodic table, $Ca(ClO_4)_2$ and $Ba(ClO_4)_2$; complexes of these salts with 1,4-butanediol, ethylene glycol, polyethylene glycol, propylene glycol and polypropylene glycol as polyhydric alcohols, and derivatives thereof; complexes of these salts with ethylene glycol monomethyl ether, ethylene glycol monoethyl ether, polyethylene glycol monomethyl ether and polyethylene glycol monoethyl ether as monools; as cationic surfactants, quaternary ammonium salts; as anionic surfactants, aliphatic sulfonates, alkylsulfate ester salts and alkylphosphate ester salts; and as amphoteric surfactants, betaine.

The electron conductive agent includes as carbonaceous substances, carbon black and graphite; as metals or alloys, aluminum, silver, gold, tin-lead alloys and copper-nickel alloys; as metal oxides, zinc oxide, titanium oxide, aluminum oxide, tin oxide, antimony oxide, indium oxide and silver oxide; and substances in which various types of fillers are plated with copper, nickel or silver as a conductive metal. These conductivity imparting agents using the ionic conduction mechanism or the electronic conduction mechanism have powdery or fibrous forms, and may be used singly or as a mixture of two or more. Above all, carbon black is suitably used from the viewpoint of easy control of the conductivity, and the economic efficiency.

The elastic layer 12 more desirably includes a silicone rubber including a polysiloxane. This is because changes in physical properties are hardly caused even if an elastic roller is subjected to a heat treatment in a cylindrical mold. The silicone rubber may be used singly, or in combination thereof with one or more selected from the group consisting of natural rubber, isoprene rubber, styrene rubber, butyl rubber, butadiene rubber, fluororubber and urethane rubber.

The silicone rubber includes polydimethylsiloxane, polymethyltrifluoropropylsiloxane, polymethylvinylsiloxane, polytrifluoropropylvinylsiloxane, polymethylphenylsiloxane, polyphenylvinylsiloxane and copolymers of a plurality of these polysiloxanes.

The silicone rubber constituting the elastic layer 12 includes a cyclic siloxane desirably for more relaxing the compression set. Although a silicone rubber usually includes a cyclic siloxane, the content thereof may be controlled by previous blending of a cyclic siloxane having no reactivity. The content of a cyclic siloxane included in an elastic layer is desirably 5% by mass or more and 20% by mass or less. Making the content to be 5% by mass or more can promote relaxation of the compression set, and making the content to be 20% by mass or less can suppress a decrease in the outer diameter of an elastic roller between before and after the treatment.

The content of a cyclic siloxane included in an elastic layer can be determined by cutting out a silicone rubber elastic layer into an appropriate size, immersing the cut out rubber in methyl ethyl ketone (MEK) for 24 hours to extract the cyclic siloxane, and measuring a change in weight of the rubber between before and after the extraction.

(Surface Layer)

A material used as the surface layer 13 includes epoxy resins, diallyl phthalate resins, polycarbonate resin, fluororesins, polypropylene resins, urea resins, melamine resins, silicon resins, polyester resins, styrenic resins, vinyl acetate resins, phenol resins, polyamide resins, cellulosic resins, urethane resins, silicone resins, acrylic urethane resins and water-based resins. These may be used in combination of two or more. In a developing roller and a charging roller, particularly use of a urethane resin or an acrylic urethane resin as a nitrogen-containing compound is desirable for controlling the chargeability of a toner, and above all, the surface layer more desirably includes a urethane resin obtained by reaction of an isocyanate compound with a polyol.

The isocyanate compound includes diphenylmethane-4,4'-diisocyanate, 1,5-naphthalene diisocyanate, 3,3'-dimethylbiphenyl-4,4'-diisocyanate, 4,4'-dicyclohexylmethane diisocyanate, p-phenylene diisocyanate, isophorone diisocyanate, carbodiimide-modified MDI, xylylene diisocyanate, trimethylhexamethylene diisocyanate, tolylene diisocyanate, naphthylene diisocyanate, para-phenylene diisocyanate, hexamethylene diisocyanate and polymethylene polyphenyl polyisocyanate. Mixtures thereof may be used, and the mixing proportion thereof may be any one.

A polyol used here includes as divalent polyols (diols), ethylene glycol, diethylene glycol, propylene glycol, dipropylene glycol, 1,4-butanediol, hexanediol, neopentylglycol, 1,4-cyclohexanediol, 1,4-cyclohexanedimethanol, xylene glycol and triethylene glycol; and as tri- or more valent polyols, 1,1,1-trimethylolpropane, glycerol, pentaerythritol and sorbitol. Furthermore, polyols such as high-molecular weight polyethylene glycols, polypropylene glycols and ethylene oxide-propylene oxide block glycols, obtained by addition of ethylene oxide or propylene oxide to a diol or a triol, may be used. Mixtures thereof may be used, and the mixing proportion thereof may be any one.

The surface layer 13 may include a conductive agent in order to regulate the electric resistance of an elastic roller. Specific examples of the included conductive agent may be the similar ones as exemplified as conductive agents used for the elastic layer.

The thickness of the surface layer 13 is desirably 1.0 μm or more and 500.0 μm or less, and more desirably 1.0 μm or more and 50.0 μm or less. Making the surface layer 13 to be 1.0 μm or more can impart the durability. Making that to be 500.0 μm or less, and more desirably 50.0 μm or less can reduce the MD-1 hardness, and can suppress wear of a photoreceptor drum. The thickness of the surface layer 13 in the present invention refers to an arithmetic average of optional five points of the distance from an interface between a surface layer and an elastic layer to a flat portion of a surface of the surface layer, obtained by observation of the cross-section in the thickness direction of the surface layer by using a digital microscope VHX-600, made by Keyence Corp.

The MD-1 hardness of the elastic roller 10 is desirably 25.0° or more and 40.0° or less. Making the hardness to be 25.0° or more can suppress deformation of the roller by abutting members. Making that to be 40.0° or less can suppress wear of a photoreceptor drum. Here, the MD-1 hardness refers to a value of a micro rubber hardness measured in a room interior whose temperature and humidity are controlled at 23° C. and at 50% RH, by using a Micro Rubber Hardness tester MD-1, made by Kobunshi Keiki Co., Ltd.

The surface roughness of the elastic roller 10 is not especially limited, and can be suitably adjusted for use of the roller in order to secure the transporting power of a developer, and suppress ghost and density unevenness by a sufficient image density to obtain high-quality images.

A method for controlling the surface roughness effectively involves making the surface layer 13 include particles having a desired particle diameter. Alternatively, a desired surface roughness can be formed by suitably subjecting a surface layer to a grinding treatment before or after the formation of the surface layer. In this case, and in the case where a plurality of elastic layers is formed, a grinding treatment may be carried out after the formation of the plurality of layers. Further in the case where an elastic layer and a surface layer are formed, the surface layer may be formed after a grinding treatment is carried out after the formation of the elastic layer, or the grinding treatment may be carried out after the formation of the surface layer.

As the particle included in the surface layer 13, a metal particle and a resin particle having a particle diameter of 0.1 μm or larger and 30.0 μm or smaller can be used. Above all, a resin particle, which is rich in flexibility and relatively small in the specific gravity to easily give stability to a coating, is more desirable. The resin particle includes urethane particles, nylon particles and silicone particles. These resin particles may be used singly or as a mixture of two or more. In the case where a plurality of surface layers is formed, the particle may be included in all the plurality of surface layers, or may be included in at least one layer of the plurality of surface layers.

<Process for Producing a Regenerated Elastic Roller>

Then, a process for producing a regenerated elastic roller by relaxing a compression set of an elastic roller whose elastic layer has the compression set caused in usage will be described in detail. The method includes a step of heating an elastic roller whose elastic layer to become a regenerated object has a compression set caused therein, in a cylindrical mold to thermally expand the elastic layer and to cause a surface of the elastic roller to contact an inner wall of the cylindrical mold.

<Compression Set Relaxing Apparatus According to the Present Invention>

Figure 2:
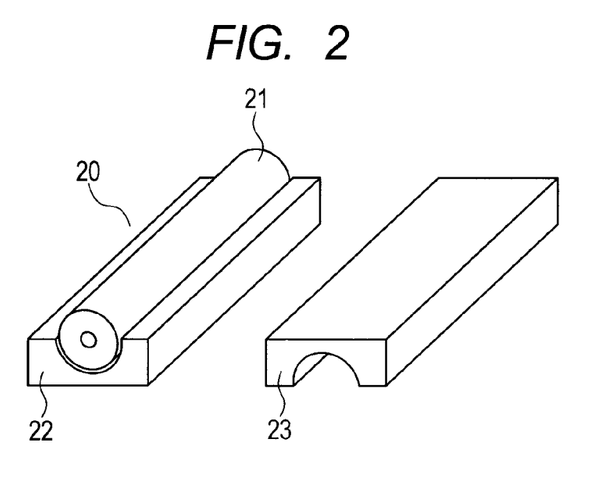
FIG. 2 is a schematic sectional diagram illustrating an example of the compression set relaxing apparatus according to the present invention.
Figure 3:
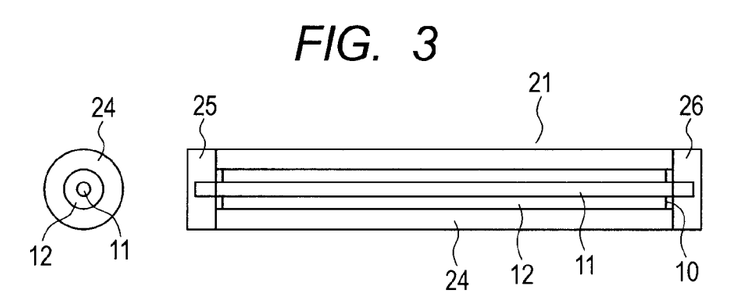
FIG. 3 is a schematic sectional diagram illustrating an example of a cylindrical mold of the compression set relaxing apparatus according to the present invention.

FIG. 2 is a schematic diagram illustrating an example of the compression set relaxing apparatus according to the process for producing a regenerated elastic roller according to the present invention. In FIG. 2, the compression set relaxing apparatus 20 includes a cylindrical mold 21, a lower-side heating plate 22, and an upper-side heating plate 23. The lower-side heating plate and the upper-side heating plate are each installed in the interior with a heater not illustrated in figure, and the temperature of the cylindrical mold installed between the lower-side heating plate and the upper-side heating plate can be optionally regulated. The cylindrical mold 21 includes, as illustrated in FIG. 3, a cylindrical pipe 24, and a first holder 25 and a second holder 26 disposed on both ends of the pipe and holding a conductive mandrel 11 of an elastic roller 10. The conductive mandrel 11 installed in the cylindrical mold 21 may be installed with a heater not illustrated in figure so as to control the temperature of the conductive mandrel 11 to a desired one.

An inner diameter of the cylindrical pipe 24 is required so that the elastic roller 10 can be inserted into the cylindrical pipe 24 at ordinary temperature without injuring the elastic roller. The inner diameter of the cylindrical mold is also required to be suitably controlled so that a surface of the elastic roller contacts with an inner wall of a cylindrical mold, when the elastic roller is heated to a desired temperature in the cylindrical mold to thermally expand an elastic layer of the elastic roller.

The inner wall of the cylindrical pipe 24 is desirably formed to a reasonably smooth surface so that an elastic roller surface contacts sufficiently therewith, when the elastic roller is heated to a desired temperature in the cylindrical mold to thermally expand the elastic layer of the elastic roller.

Then, the operation of the compression set relaxing apparatus will be described. First, the elastic roller 10 whose compression set is to be relaxed is inserted into the cylindrical pipe 24 at ordinary temperature. Then, the first holder 25 and the second holder 26 are installed on both ends of the pipe so as to hold the conductive mandrel 11 of the elastic roller 10, to constitute the cylindrical mold 21. Then, the cylindrical mold 21 holding the elastic roller 10 is installed on the lower-side heating plate 22, and the upper-side heating plate 23 is installed thereon. Thereafter, the heaters installed in the lower-side heating plate 22 and the upper-side heating plate 23, and as required, the heater connected in the conductive mandrel 11, are heated, and the temperature of the elastic roller 10 is regulated to a desired one to start the treatment. After a desired treatment time has passed, the heating by the heaters is stopped, and the elastic roller 10 is taken out after the cylindrical mold 21 is cooled, to complete the treatment of relaxing the compression set.

The temperature for the relaxing treatment of the compression set may be suitably selected in order to achieve a desired relaxation amount of the compression set. Specifically, the treatment temperature is desirably 120° C. or higher and 300° C. or lower. Making the temperature to be 120° C. or higher imparts thermal motion to bonds of a resin material constituting an elastic layer to allow the strain of the bonds to be sufficiently relaxed, which is desirable. Making the temperature to be 300° C. or lower can suppress a change in the hardness of the elastic layer due to the heating, and can suppress a variation in the outer diameter between before and after the relaxation treatment of the compression set, which is desirable. Both of the cylindrical mold and the conductive mandrel may be heated. In this case, the temperature of the conductive mandrel is desirably controlled higher than that of the cylindrical mold, in the range of the treatment temperature described above. The time for the relaxation treatment of the compression set may be suitably selected in order to achieve a desired relaxation amount of the compression set. Use of the compression set relaxing apparatus as described above can achieve the relaxation of the compression set of an elastic layer.

<Measuring Apparatus of the Amount of the Compression Set According to the Present Invention>

The amount of the compression set of the elastic roller 10 can be measured using a laser displacement sensor (LT-9500V (trade name), made by Keyence Corp.). A laser displacement sensor was installed in the direction perpendicular to the surface of the elastic roller 10; and the elastic roller 10 was rotationally driven at an optional rotation frequency, and displacements in the circumferential direction of the surface of the elastic roller 10 were read out to measure amounts of compression set of portions where the compression sets had occurred. The amount of compression set was measured at five points in 43-mm pitch in the longitudinal direction, and taken as a five-point average value.

<Outer Diameter Measuring Apparatus for the Elastic Roller According to the Present Invention>

The outer diameter of the elastic roller 10 can be measured using a digital dimension tester (LS-7000 (trade name), made by Keyence Corp.). A digital dimension tester was installed in the direction perpendicular to the surface of the elastic roller 10; and the elastic roller 10 was rotationally driven at an optional rotation frequency, and outer diameters in the circumferential direction of the elastic roller 10 were measured. The outer diameter of the elastic roller 10 was measured at five points in 43-mm pitch in the longitudinal direction, and taken as a five-point average value.

EXAMPLES

Hereinafter, the present invention will be described in detail by way of Examples and Comparative Examples.

Example 1

<Fabrication of an Elastic Roller>

According to the following procedure, an elastic roller was fabricated in which one layer of an elastic layer and one layer of a resin layer as a surface layer were provided as a coating layer on the periphery of a cylindrical conductive mandrel. The conductive mandrel used a SUS304-made core metal having a diameter of 6 mm and a length of 279 mm.

As a material for the elastic layer, a liquid silicone rubber was prepared by the following method. First, materials described in Table 1 shown below were mixed to make a base material for the liquid silicone rubber.

TABLE 1

| | |
|---|---|
| Dimethylpolysiloxane having a vinyl group at both terminals and a viscosity at 25° C. of 100 Pa·s (made by Dow Corning Toray Co., Ltd., weight-average molecular weight: 100,000) | 100 parts by mass |
| Cyclic polysiloxane having no reactivity (made by Dow Corning Toray Co., Ltd., trade name: DC246Fluid) | 15 parts by mass |

TABLE 1-continued

| | |
|---|---|
| Quartz powder as a filler (trade name: Min-U-Sil, made by Pennsylvania Glass Sand Corp.) | 10 parts by mass |
| Carbon black (made by Denki Kagaku Kogyo K.K., trade name: Denka Black, a powdery product) | 7 parts by mass |

A liquid silicone rubber was made by mixing a material in which a trace amount of a platinum compound (made by Dow Corning Toray Co., Ltd., Pt concentration: 1%) as a curing catalyst was blended in the base material, and a material in which 3 parts by mass of an organohydrogenpolysiloxane (made by Dow Corning Toray Co., Ltd., weight-average molecular weight: 500) was blended in the base material, in a mass ratio of 1:1.

The conductive mandrel was placed in the central part of a cylindrical mold having an inner diameter of 12 mm; the liquid silicone rubber was poured through a pouring hole into the cylindrical mold, cured at a temperature of 120° C. for 5 min, and cooled to room temperature; and thereafter, the elastic layer integrated with the conductive mandrel was removed from the mold. The elastic layer was further heated at a temperature of 150° C. for 4 hours to complete the curing reaction, whereby the elastic layer having a thickness of 3 mm and a silicone rubber as a main component was provided on the outer peripheral surface of the conductive mandrel.

Thereafter, an excimer treatment of the elastic layer surface was carried out under the following condition. That is, the elastic layer surface was subjected to an irradiation treatment by a fine-tube excimer lamp (made by Harison Toshiba Lighting Corp.) capable of radiating an ultraviolet ray of 172 nm in wavelength so that the cumulative light amount became 120 mJ/cm$^2$, while the conductive mandrel as a rotation shaft was rotated at 30 rpm. The distance between the elastic layer surface and the excimer lamp during the irradiation was set at 2 mm.

Then, the surface of the elastic layer was coated with a resin layer by the following method. Materials described in Table 2 shown below were stepwise mixed in a methyl ethyl ketone solvent, and allowed to react in a nitrogen atmosphere at a temperature of 80° C. for 6 hours to obtain a bifunctional polyurethane prepolymer having a weight-average molecular weight Mw=10,000, a hydroxyl value of 20.0 (mg·KOH/g), and degrees of molecular weight dispersion Mw/Mn=2.9 and Mz/Mw=2.5.

TABLE 2

| | |
|---|---|
| Polytetramethylene glycol (trade name: PTG650SN, made by Hodogaya Chemical Co., Ltd.), number-average molecular weight Mn = 1,000, f = 2 (f denotes the number of a functional group. hereinafter, the same);) | 100.0 parts by mass |
| 4,4'-diphenylmethane diisocyanate (MDI) (trade name: Millionate MT, made by Nippon Polyurethane Industry Co., Ltd.), f = 2, | 21.2 parts by mass |

35.0 parts by mass of an isocyanate (trade name: Colonate 2521, made by Nippon Polyurethane Industry Co., Ltd.) was added to 100.0 parts by mass of the polyurethane prepolymer so that the NCO equivalent became 1.4. The NCO equivalent refers to a ratio ([NCO]/[OH]) of a molar number of an isocyanate group in an isocyanate compound to a molar number of a hydroxyl group in a polyol component.

20.0 parts by mass of carbon black (trade name: #1000, pH: 3.0, made by Mitsubishi Chemicals Inc.) was further added. An organic solvent was added to the raw material mixed liquid, and was suitably adjusted in the range of a solid content of 20% by mass to 30% by mass so that a film thickness of about 12 μm could be obtained. 35.0 parts by mass of a urethane resin particle (trade name: C400 transparent, diameter: 14 μm, made by Negami Chemical Industrial Co., Ltd.) was further added, homogeneously dispersed and mixed to make a raw material liquid for the resin layer.

The above-mentioned conductive mandrel having the elastic layer formed was immersed in the raw material liquid for the resin layer, and thereafter taken out and naturally dried. Then, the conductive mandrel was subjected to a heating treatment of a temperature of 140° C. for 60 min to cure the raw material liquid for the resin layer; thus the resin layer having a film thickness of 12.0 μm in average was obtained to make a surface layer. Further, both ends of the coating layer were cut out and removed perpendicularly to the conductive mandrel to adjust the length of the coating layer to 235 mm.

The elastic roller was thus fabricated in which the outer diameter was 12 mm; the length of the coating layer was 235 mm; and the center line average roughness Ra in Japanese Industrial Standards (JIS) B0601: 1994, the specification of the surface roughness, was 1.7 μm. The content of the cyclic siloxane in the elastic layer was 10% by mass.

<Formation of a Compression Set on the Elastic Roller>

The obtained elastic roller was loaded as a developing roller on a process cartridge for black for an electrophotographic image forming apparatus (trade name: Color Laser Jet 3600, made by Hewlett-Packard Development Co.), and allowed to stand for 30 days in an environment at a temperature of 40° C. and a humidity of 95% RH in the state where the elastic roller was made to abut an electrophotographic photoreceptor drum. Thereafter, the elastic roller was taken out from the electrophotographic process cartridge, and measured in an environment at a temperature of 25° C. for the amount of compression set of a portion of the elastic roller where the elastic roller had abutted the electrophotographic photoreceptor drum. This value was defined as an initial amount of compression set. The initial amount of compression set was 10.5 μm. The outer diameter of the elastic roller at this time was measured by the outer diameter measuring apparatus described above, and was 11.94 mm.

<Relaxation Treatment of a Compression Set Generated in the Elastic Roller>

Then, in the cylindrical pipe of the compression set relaxing apparatus 20 described above, the elastic roller having a compression set generated in the above was placed, and was subjected to a relaxation treatment of the compression set. The cylindrical pipe 24 used was one having an inner diameter of 12.00 mm when measured in an environment at a temperature of 25° C. The condition of the relaxation treatment involved heating so that the temperature of the cylindrical mold became 150° C., and heating so that the temperature of the conductive mandrel of the elastic roller became 170° C. The time of the relaxation treatment was set at 60 sec.

Here, when the elastic roller was heated using an infrared lamp under rotation so that the surface thereof became 150° C. uniformly, and also heated so that the temperature of the conductive mandrel became 170° C., instead of placing the elastic roller in the cylindrical pipe, the outer diameter of the elastic roller was 12.46 mm. On the other hand, when the cylindrical mold was heated to a temperature of 150° C., the inner diameter of the cylindrical pipe 24 was 12.03 mm. In the above-mentioned relaxation treatment step of the compression set, a surface of the elastic roller is believed to contact an inner wall of the cylindrical mold.

After the completion of the relaxation treatment step of the compression set, the elastic roller was taken out from the cylindrical pipe, and allowed to stand in an environment at a temperature of 25° C. to cool the temperature of the elastic roller to the environmental temperature. The elastic roller thus obtained was referred to as a regenerated elastic roller. The amount of compression set and the outer diameter of the regenerated elastic roller were measured. These were defined as an amount of compression set after the relaxation treatment and an outer diameter after the relaxation treatment, respectively. As a result, the amount of compression set after the relaxation treatment was 3.5 μm, and the outer diameter after the relaxation treatment was 11.93 mm.

Here, a value obtained by dividing the amount of compression set after the relaxation by the initial amount of compression set was calculated. The value was defined as a percentage of residual compression set. The percentage of residual compression set of the regenerated elastic roller according to the present example was 33%. The proportion of an amount of the outer diameter reduction of the elastic roller between before and after the treatment to the outer diameter thereof before the treatment was determined as a percentage of outer diameter reduction. The percentage of outer diameter reduction at this time was 0.084%.

<Evaluation of Images>

The regenerated elastic roller was again loaded as a developing roller on the electrophotographic process cartridge for the electrophotographic image forming apparatus. Then, the electrophotographic process cartridge was loaded on the electrophotographic image forming apparatus, and one sheet of a halftone image was output in an environment at a temperature of 25° C. and a relative humidity of 50%. Here, the halftone image refers to an image in which horizontal lines at widths of 1 dot and at intervals of 2 dots in the rotation direction and perpendicular direction of an electrophotographic photoreceptor drum are depicted. For three sheets of halftone images output, the occurrence situation of streaks and the like caused by the compression set of the developing roller was visually confirmed, and evaluated according to the standard described in Table 3 shown below.

TABLE 3

| Rank A | No occurrence of streaks and the like caused by the compression set of the developing roller was observed. |
|---|---|
| Rank C | Streaks were observed at the rotation periods of the developing roller. |

Comparative Example 1

After an elastic roller was fabricated, a compression set was formed thereon, as in Example 1. The initial amount of compression set was 10.3 μm. The outer diameter of the elastic roller at this time was 11.94 mm. Then, the evaluation was carried out after the same time as in Example 1 had passed, except for carrying out no relaxation treatment of the compression set. The amount of compression set at this time corresponding to the amount of compression set after the relaxation of Example 1 was 9.2 μm. The outer diameter of the elastic roller at this time was 11.94 mm.

Comparative Example 2

After an elastic roller was fabricated, a compression set was formed thereon, as in Example 1. The initial amount of compression set was 10.2 μm. The outer diameter of the elastic roller at this time was 11.94 mm. Then, instead of the relaxation treatment of the compression set in Example 1, heating of the elastic roller surface using an infrared lamp was carried out. At this time, the elastic roller was rotationally driven, and heated using the infrared lamp so that the surface became 150° C. uniformly, and also subjected to a heating treatment for 60 sec so that the temperature of the conductive mandrel became 170° C. Thereafter, the evaluation was carried out as in Example 1. The amount of compression set at this time corresponding to the amount of compression set after the relaxation of Example 1 was 7.5 μm. The outer diameter of the elastic roller at this time was 11.94 mm.

Example 2

After an elastic roller was fabricated, a compression set was formed thereon, as in Example 1. The initial amount of compression set was 10.3 μm. The outer diameter of the elastic roller at this time was 11.94 mm. Then, the relaxation treatment of the compression set was carried out as in Example 1, except for altering the heating temperature of the conductive mandrel to 100° C., and thereafter, the evaluation was carried out. The amount of compression set after the relaxation was 4.5 μm. The outer diameter of the elastic roller at this time was 11.92 mm.

Example 3

After an elastic roller was fabricated, a compression set was formed thereon, as in Example 1. The initial amount of compression set was 10.6 μm. The outer diameter of the elastic roller at this time was 11.95 mm. Then, the relaxation treatment of the compression set was carried out as in Example 1, except for altering the heating temperature of the conductive mandrel to 150° C., and thereafter, the evaluation was carried out. The amount of compression set after the relaxation was 4.0 μm. The outer diameter of the elastic roller at this time was 11.94 mm.

Example 4

After an elastic roller was fabricated, a compression set was formed thereon, as in Example 1. The initial amount of compression set was 10.4 μm. The outer diameter of the elastic roller at this time was 11.94 mm. Then, the relaxation treatment of the compression set was carried out as in Example 1, except for altering the heating temperature of the conductive mandrel to 160° C., and thereafter, the evaluation was carried out. The amount of compression set after the relaxation was 3.1 μm. The outer diameter of the elastic roller at this time was 11.93 mm.

Example 5

After an elastic roller was fabricated, a compression set was formed thereon, as in Example 1. The initial amount of compression set was 10.3 μm. The outer diameter of the elastic roller at this time was 11.94 mm. Then, the relaxation treatment of the compression set was carried out as in Example 1, except for altering the heating temperature of the conductive mandrel to 200° C., and thereafter, the evaluation was carried out. The amount of compression set after the relaxation was 2.7 μm. The outer diameter of the elastic roller at this time was 11.92 mm.

Example 6

After an elastic roller was fabricated, a compression set was formed thereon, as in Example 1. The initial amount of compression set was 10.4 μm. The outer diameter of the elastic roller at this time was 11.93 mm. Then, the relaxation treatment of the compression set was carried out as in Example 1, except for altering the temperature of the cylindrical mold to 130° C. and the heating temperature of the conductive mandrel to 100° C., and thereafter, the evaluation was carried out. The amount of compression set after the relaxation was 5.2 μm. The outer diameter of the elastic roller at this time was 11.93 mm.

Example 7

After an elastic roller was fabricated, a compression set was formed thereon, as in Example 1. The initial amount of compression set was 10.1 μm. The outer diameter of the elastic roller at this time was 11.94 mm. Then, the relaxation treatment of the compression set was carried out as in Example 1, except for altering the temperature of the cylindrical mold to 130° C. and the heating temperature of the conductive mandrel to 130° C., and thereafter, the evaluation was carried out. The amount of compression set after the relaxation was 4.2 μm. The outer diameter of the elastic roller at this time was 11.94 mm.

Example 8

After an elastic roller was fabricated, a compression set was formed thereon, as in Example 1. The initial amount of compression set was 10.2 μm. The outer diameter of the elastic roller at this time was 11.95 mm. Then, the relaxation treatment of the compression set was carried out as in Example 1, except for altering the temperature of the cylindrical mold to 130° C. and the heating temperature of the conductive mandrel to 150° C., and thereafter, the evaluation was carried out. The amount of compression set after the relaxation was 3.0 μm. The outer diameter of the elastic roller at this time was 11.94 mm.

Example 9

After an elastic roller was fabricated, a compression set was formed thereon, as in Example 1. The initial amount of compression set was 10.4 μm. The outer diameter of the elastic roller at this time was 11.94 mm. Then, the relaxation treatment of the compression set was carried out as in Example 1, except for altering the temperature of the cylindrical mold to 170° C. and the heating temperature of the conductive mandrel to 100° C., and thereafter, the evaluation was carried out. The amount of compression set after the relaxation was 4.0 μm. The outer diameter of the elastic roller at this time was 11.93 mm.

Example 10

After an elastic roller was fabricated, a compression set was formed thereon, as in Example 1. The initial amount of compression set was 10.6 μm. The outer diameter of the elastic roller at this time was 11.94 mm. Then, the relaxation treatment of the compression set was carried out as in Example 1, except for altering the temperature of the cylindrical mold to 170° C. and the heating temperature of the conductive mandrel to 170° C., and thereafter, the evaluation was carried out. The amount of compression set after the relaxation was 3.3 μm. The outer diameter of the elastic roller at this time was 11.92 mm.

Example 11

After an elastic roller was fabricated, a compression set was formed thereon, as in Example 1. The initial amount of compression set was 10.4 µm. The outer diameter of the elastic roller at this time was 11.95 mm. Then, the relaxation treatment of the compression set was carried out as in Example 1, except for altering the temperature of the cylindrical mold to 170° C. and the heating temperature of the conductive mandrel to 200° C., and thereafter, the evaluation was carried out. The amount of compression set after the relaxation was 2.5 µm. The outer diameter of the elastic roller at this time was 11.93 mm.

Example 12

An elastic roller was fabricated as in Example 1, except for altering the amount of the cyclic polysiloxane added when the elastic roller was fabricated to 5 parts by mass. The content of the cyclic siloxane in the elastic layer was 3% by mass. Thereafter, a compression set was formed as in Example 1. The initial amount of compression set was 9.8 µm. The outer diameter of the elastic roller at this time was 11.94 mm. Then, the relaxation treatment of the compression set was carried out as in Example 1, and thereafter, the evaluation was carried out. The amount of compression set after the relaxation was 3.5 µm. The outer diameter of the elastic roller at this time was 11.94 mm.

Example 13

An elastic roller was fabricated as in Example 1, except for altering the amount of the cyclic polysiloxane added when the elastic roller was fabricated to 10 parts by mass. The content of the cyclic siloxane in the elastic layer was 5% by mass. Thereafter, a compression set was formed as in Example 1. The initial amount of compression set was 10.1 µm. The outer diameter of the elastic roller at this time was 11.94 mm. Then, the relaxation treatment of the compression set was carried out as in Example 1, and thereafter, the evaluation was carried out. The amount of compression set after the relaxation was 3.0 µm. The outer diameter of the elastic roller at this time was 11.94 mm.

Example 14

An elastic roller was fabricated as in Example 1, except for altering the amount of the cyclic polysiloxane added when the elastic roller was fabricated to 25 parts by mass. The content of the cyclic siloxane in the elastic layer was 20% by mass. Thereafter, a compression set was formed as in Example 1. The initial amount of compression set was 10.7 µm. The outer diameter of the elastic roller at this time was 11.95 mm. Then, the relaxation treatment of the compression set was carried out as in Example 1, and thereafter, the evaluation was carried out. The amount of compression set after the relaxation was 2.3 µm. The outer diameter of the elastic roller at this time was 11.93 mm.

Example 15

An elastic roller was fabricated as in Example 1, except for altering the amount of the cyclic polysiloxane added when the elastic roller was fabricated to 30 parts by mass. The content of the cyclic siloxane in the elastic layer was 25% by mass. Thereafter, a compression set was formed as in Example 1. The initial amount of compression set was 10.8 µm. The outer diameter of the elastic roller at this time was 11.93 mm. Then, the relaxation treatment of the compression set was carried out as in Example 1, and thereafter, the evaluation was carried out. The amount of compression set after the relaxation was 2.2 µm. The outer diameter of the elastic roller at this time was 11.90 mm. There are shown in Table 4 the results in Examples 1 to 15 of the amounts of compression set before and after the relaxation treatment, the percentages of residual compression set, the outer diameters before and after the relaxation treatment, the amounts of outer diameter reduction and percentages of outer diameter reduction, and the image evaluations when the regenerated elastic rollers were used as developing rollers. There are shown in Table 5 the results in Comparative Examples 1 and 2 of the amounts of compression set before and after the treatment (including being left to stand) corresponding to the relaxation treatment in Examples, the percentages of residual compression set, the outer diameters before and after the treatment (including being left to stand) corresponding to the relaxation treatment in Examples, the amounts of outer diameter reduction and percentages of outer diameter reduction, and the image evaluations when the elastic rollers were used as developing rollers after the treatment (including being left to stand) corresponding to the relaxation treatment in Examples.

TABLE 4

| Example | Amount of Compression Set (µm) | | Percentage of Residual Compression Set | Outer Diameter (mm) | | Amount of Outer Diameter Reduction (mm) | Percentage of Outer Diameter Reduction | Image Evaluation |
|---|---|---|---|---|---|---|---|---|
| | Before Relaxation | After Relaxation Treatment | | Before Relaxation | After Relaxation Treatment | | | |
| 1 | 10.5 | 3.5 | 33% | 11.94 | 11.93 | 0.01 | 0.084% | A |
| 2 | 10.3 | 4.5 | 44% | 11.94 | 11.92 | 0.02 | 0.168% | A |
| 3 | 10.4 | 3.1 | 30% | 11.95 | 11.94 | 0.01 | 0.084% | A |
| 4 | 10.4 | 3.1 | 30% | 11.94 | 11.93 | 0.01 | 0.084% | A |
| 5 | 10.3 | 2.7 | 26% | 11.94 | 11.92 | 0.02 | 0.168% | A |
| 6 | 10.4 | 5.2 | 50% | 11.93 | 11.93 | 0.00 | 0.000% | A |
| 7 | 10.1 | 4.2 | 42% | 11.94 | 11.94 | 0.00 | 0.000% | A |
| 8 | 10.2 | 3 | 29% | 11.95 | 11.94 | 0.01 | 0.084% | A |
| 9 | 10.4 | 4 | 38% | 11.94 | 11.93 | 0.01 | 0.084% | A |
| 10 | 10.6 | 3.3 | 31% | 11.94 | 11.92 | 0.02 | 0.168% | A |
| 11 | 10.4 | 2.5 | 24% | 11.95 | 11.93 | 0.02 | 0.167% | A |
| 12 | 9 | 3.5 | 39% | 11.94 | 11.94 | 0.00 | 0.000% | A |
| 13 | 10.1 | 3 | 30% | 11.94 | 11.94 | 0.00 | 0.000% | A |
| 14 | 10.7 | 2.3 | 21% | 11.95 | 11.93 | 0.02 | 0.167% | A |
| 15 | 10.8 | 2.2 | 20% | 11.93 | 11.9 | 0.03 | 0.251% | A |

TABLE 5

| Comparative Example | Amount of Compression Set (μm) | | | Outer Diameter (mm) | | Amount of Outer Diameter Reduction (mm) | Percentage of Outer Diameter Reduction | Image Evaluation |
|---|---|---|---|---|---|---|---|---|
| | Before Relaxation | After Treatment Corresponding to Relaxation Treatment | Percentage of Residual Compression Set | Before Relaxation | After Treatment Corresponding to Relaxation Treatment | | | |
| 1 | 10.3 | 9.2 | 89% | 11.94 | 11.94 | 0.00 | 0.000% | C |
| 2 | 10.2 | 7.5 | 74% | 11.94 | 11.94 | 0.00 | 0.000% | C |

Example 16

An elastic roller was fabricated as in Example 1, except for using a cylindrical mold having an inner diameter of 8.5 mm as the cylindrical mold in the formation step of an elastic layer in Example 1. The elastic roller was loaded as a charging roller on an electrophotographic process cartridge for black for an electrophotographic image forming apparatus (trade name: Color LaserJet 3600, made by Hewlett-Packard Development Co.), and allowed to stand for 30 days in an environment at a temperature of 40° C. and a humidity of 95% RH in the state where the elastic roller was made to abut an electrophotographic photoreceptor drum. Thereafter, the elastic roller was taken out from the electrophotographic process cartridge, and measured for the amount of compression set and the outer diameter. The amount of compression set was 7.3 μm, and the outer diameter was 8.44 mm.

Then, a regenerated elastic roller was obtained by carrying out the compression set relaxation treatment as in Example 1, except for using a cylindrical pipe 24 having an inner diameter, as measured in an environment at a temperature of 25° C., of 8.50 mm. The regenerated elastic roller was evaluated as in Example 1. As a result, the amount of compression set after the relaxation treatment was 3.2 μm. The outer diameter after the relaxation treatment was 8.44 mm. Therefore, at this time, the percentage of residual compression set was 44%, and the percentage of outer diameter reduction was 0.000%. Then, the regenerated elastic roller was loaded as a charging roller on the electrophotographic process cartridge, and the electrophotographic process cartridge was loaded on the main body of the electrophotographic image forming apparatus, and three sheets of a halftone image was output as in Example 1. In the case where large compression sets are generated on the charging roller, the potential of an electrophotographic photoreceptor drum disturbs on portions where the compression sets are generated, and as a result, streaks caused by the compression sets are generated at rotation periods of the charging roller on an electrophotographic image. However, in the halftone images output in the present Example, defects such as streaks caused by the compression set of the charging roller were not visually observed.

Comparative Example 3

A compression set was formed on a charging roller as in Example 16. The initial compression set was 7.1 μm. The outer diameter at this time was 8.45 mm. The evaluation was carried out after the elapse of the same time as in Example 1, except for carrying out no relaxation treatment of the compression set. The amount of compression set in this case corresponding to the amount of compression set after the relaxation in Example 1 was 6.8 μm. The outer diameter of the elastic roller at this time was 8.45 mm. Therefore, the percentage of residual compression set at this time was 96%, and the percentage of outer diameter reduction was 0.000%. Then, halftone images were output as in Example 16, except for using the charging roller of the present Comparative Example. As a result, streaks caused by the compression set were visually observed on the images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-221421, filed Sep. 30, 2010, which is hereby incorporated by reference herein in its entirety.

What is claimed is:

1. A process for producing a regenerated elastic roller, comprising the steps of:
   heating in a cylindrical mold an elastic roller comprising an electrically conductive mandrel and an elastic layer to which a compression set has occurred, and
   thermally expanding said elastic layer so that the surface of said elastic roller comes into contact with an inner surface of said cylindrical mold.

2. The process according to claim 1, wherein
   said heating step comprises heating said mandrel and said cylindrical mold so that the temperature of said mandrel is higher than that of said cylindrical mold.

3. The process according to claim 1, wherein the elastic layer comprises a silicone rubber.

4. The process according to claim 1, wherein the regenerated elastic roller further comprises a surface layer coating the elastic layer.

* * * * *